US008634357B2

(12) United States Patent
Guey et al.

(10) Patent No.: US 8,634,357 B2
(45) Date of Patent: Jan. 21, 2014

(54) DISTRIBUTED ANTENNA SYSTEM

(75) Inventors: Jiann-Ching Guey, Fremont, CA (US); Kambiz C. Zangi, Chapel Hill, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 515 days.

(21) Appl. No.: 12/740,385

(22) PCT Filed: Oct. 30, 2007

(86) PCT No.: PCT/US2007/082955
§ 371 (c)(1),
(2), (4) Date: May 27, 2010

(87) PCT Pub. No.: WO2009/058129
PCT Pub. Date: May 7, 2009

(65) Prior Publication Data
US 2010/0260103 A1    Oct. 14, 2010

(51) Int. Cl.
*H04B 7/14*        (2006.01)
*H04W 4/00*        (2009.01)

(52) U.S. Cl.
USPC .............................. 370/329; 370/315; 370/331

(58) Field of Classification Search
None
See application file for complete search history.

(56) References Cited

U.S. PATENT DOCUMENTS

| 6,282,425 | B1* | 8/2001 | Hottinen | 455/453 |
| 6,308,085 | B1 | 10/2001 | Shoki | |
| 2006/0025158 | A1 | 2/2006 | Leblanc et al. | |
| 2007/0064642 | A1* | 3/2007 | Watabe et al. | 370/324 |
| 2007/0173243 | A1* | 7/2007 | Li | 455/422.1 |
| 2007/0223419 | A1* | 9/2007 | Ji et al. | 370/329 |
| 2008/0214185 | A1* | 9/2008 | Cho et al. | 455/424 |

FOREIGN PATENT DOCUMENTS

WO    2006/102918 A1    10/2006

OTHER PUBLICATIONS

Gu, D., et al., "Mobile User Registration in Cellular Systems With Overlapping Location Areas", IEEE Vehicular Technology Conference, pp. 802-806, May 1999.

* cited by examiner

*Primary Examiner* — Jutai Kao
(74) *Attorney, Agent, or Firm* — Coats & Bennett, P.L.L.C.

(57) ABSTRACT

A wireless communication network employs a distributed antenna system to provide radio coverage. The wireless communication network comprises a plurality of access points providing service in respective coverage areas. The access point within each coverage area connects to a plurality of antennas that are widely distributed within the coverage area. Radio resources at antennas within the overlapping region of two or more neighboring coverage areas are shared by the access points in the neighboring coverage areas according to a multiple access scheme. The sharing of radio resources within the overlapping region of two or more coverage areas allows the overlapping region to be enlarged, thereby providing more time to complete a handover.

13 Claims, 3 Drawing Sheets

DISTRIBUTED ANTENNA SYSTEM

TECHNICAL FIELD

The present invention relates generally to distributed antenna systems for mobile communications.

This disclosure presents a wireless communication network that, for example, comprises a plurality of access points providing service to mobile devices over respective coverage areas. A plurality of antennas is distributed within each coverage area. In some embodiments, a first subset of antennas in an overlapping region (of given neighboring coverage areas) may connect to an access point in a first one of said neighboring coverage areas, and a second subset of antennas in the overlapping region may connect to an access point in a second one of said neighboring coverage areas.

In some embodiments, one or more of said antennas in said overlapping region of said neighboring coverage areas may be connected to and used by two or more access points in said neighboring coverage areas. That is, two access points associated with respective neighboring coverage areas may share one or more of the antennas within the overlapping region of those neighboring coverage areas.

In some embodiments, the access points in neighboring coverage areas may be pre-configured to use certain shared radio resources at antennas within said overlapping region.

In some embodiments, said network may reallocate shared radio resources at antennas within said overlapping region based on changing conditions. In some embodiments, said access points in said neighboring coverage areas may negotiate directly to reallocate the shared radio resources. In some embodiments, the network may further comprise a first handover boundary in said overlapping region for mobile devices moving from a first coverage area toward a second coverage area, and a second handover boundary in said overlapping region spaced from said first handover boundary for mobile devices moving from said second coverage area toward said first coverage area.

In some embodiments, said network may initiate a handover of a mobile device in said overlapping region based on the strength of received signals from said mobile devices at antennas on a target side and a serving side of a handover boundary.

In some embodiments, said mobile devices in said overlapping region may initiate a handover from a serving access point to a target access point based on the strength of received signals at said mobile devices from antennas on a target side and a serving side of a handover boundary.

BACKGROUND

A distributed antenna system (DAS) or a distributed radio system (DRS) generally refers to a radio-access architecture comprising a large number of antennas (or radio heads) distributed widely across a large coverage area and connected to a centralized access point (AP). The radiation coverage of each antenna typically has a much smaller footprint than that of a base-centrally-located antenna/base station in a conventional cellular system. The DAS architecture has two main advantages. First, it is possible to achieve high spatial re-use capacity due to the small coverage area of each antenna. Second, the centralized access point has complete control of all the radio resources used at each antenna and can therefore coordinate the transmission and reception of signals to minimize interference in an increased system capacity.

Typically, the antennas in a DAS are connected to the AP through optical fibers. The AP may process the received (up-link) signals from multiple devices using appropriate combining techniques, such as maximum ratio combing (MRC) or interference rejection combining (IRC). On the downlink, the AP may transmit to multiple devices using zero forcing or dirty papercoding to suppress interference if the forward link channel is known. The AP may also use macro diversity techniques to direct radiation to specific mobile devices if the channel is not known.

The capacity enhancements associated with DAS are well documented in isolated systems in which all antennas are connected to a single AP. In reality, the coverage area of an AP is limited by factors such as fiber length, propagation delay, and computing power. Therefore, a practical DAS more than likely will have multiple APs within respective coverage areas and mobile devices will need to be handed over from one AP to another in a manner similar to conventional cellular systems.

Handover may be approached in a DAS in a manner similar to a conventional cellular system. In a conventional system, the mobile device periodically makes signal strength quality measurements and reports the signal quality measurements to a radio network controller that coordinates handovers between a serving base station and a target base station. In general, a handover is triggered when the signal strength from a target base station exceeds the signal strength from the current serving base station by some predetermined amount.

The conventional method for handover can be problematic in a DAS. As previously described, the radio coverage area of an antenna in a DAS is much smaller than that of a centrally-located antenna in a conventional cellular system. Therefore, the overlap in coverage areas between two APs in a DAS is much smaller when compared to a conventional cellular system. For a mobile device traveling at moderate speed, the time in which to execute a handover will be much shorter than a conventional cellular system. This brief period may not be sufficient to complete a seamless handover, which may lead to a brief interruption in service. In a worst case, the handover may fail.

SUMMARY

The present invention relates to distributed antenna systems for wireless communication networks. A plurality of access points provides service over respective coverage areas in the distributed antenna system. The access point within each coverage area connects to a plurality of antennas that are widely distributed within the coverage area. Radio resources at antennas within the overlapping region of two or more neighboring coverage areas are shared by the access points in the neighboring coverage areas according to a multiple access scheme. The sharing of radio resources within the overlapping region of two or more coverage areas allows the overlapping region to be enlarged, thereby providing more time to complete a handover.

In a first exemplary embodiment, access points in two or more neighboring coverage areas may connect to the same antenna in the overlapping region of the coverage areas. In this case, the radio resources at the shared antenna are shared between the access points. For example, the access points in the neighboring coverage areas may be assigned different frequencies, different time slots, and/or different codes to use for transmission and reception of signals.

In another exemplary embodiment, the access points in the neighboring coverage areas each connect to a respective subset of antennas in the overlapping region. Radio resources are shared by allocating radio resources between antennas connecting to different access points.

DETAILED DESCRIPTION

Figure 1:
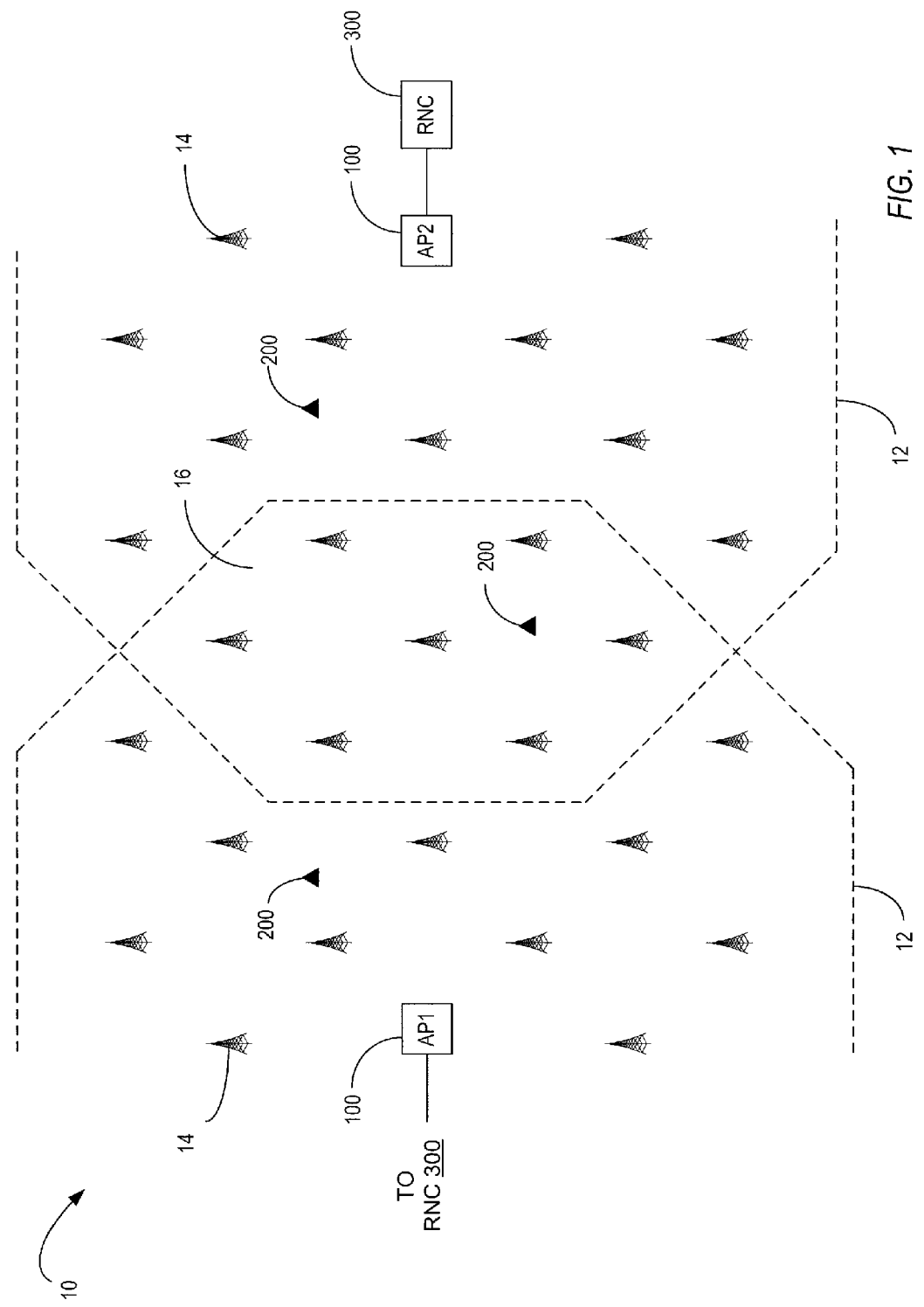
FIG. 1 illustrates an exemplary wireless communication network using a distributed antenna system.

Referring now to the drawings, FIG. 1 illustrates an exemplary wireless communication network indicated generally by the numeral 10. The wireless communication network 10 comprises a plurality of access points 100 that provide radio access to mobile devices 200 within their respective coverage areas 12. In FIG. 1, two axis points 100 are shown and are denominated as AP1 and AP2, respectively. Those skilled in the art will appreciate, however, that a typical network 10 may include many access points 100 and corresponding coverage areas 12. A radio network controller (RNC) 300 connects to each access point 12. One function of the radio network controller 300 is to manage handover of mobile devices 200 from one access point 100 to another as hereinafter described.

In a conventional cellular system, each access point 100 typically connects to a single antenna located at the center of each coverage area. According to the present invention, each coverage area uses a distributed antenna system (DAS) rather than a single, centrally located antenna. The access point 100 in each coverage area connects to a plurality of antennas 14 that are widely distributed over each coverage area 12. The radiation coverage of each antenna 14 is typically much smaller than a base station antenna in a conventional cellular system. However, the antennas 14 in each coverage area 12 collectively provide radiation coverage throughout the entire coverage area 12.

The DAS architecture has two main advantages. First, it is possible to achieve high spatial re-use capacity due to the small coverage area of each antenna 14. Second, the centralized access point 100 has complete control of its allocated radio resources at each antenna 14 and can therefore coordinate the transmission and reception of signals to minimize interference in an increased system capacity. As will be described in greater detail below, the radio resources at some antennas 14 may be shared with other access points 100.

As shown in FIG. 1, the coverage areas of AP1 and AP2 in the present invention overlap to include one or more antennas 14. The overlapping region of the neighboring access points 100 is designated by reference numeral 16. In various embodiments, the transmit antennas 14 in the overlapping region 16 may connect to one or both of the neighboring access points 100. In either case, the radio resources at the transmit antennas 14 in the overlapping region 16 are shared between the neighboring access points 100 according to a multiple access scheme (e.g., TDM, FDM, CDM, OFDM, etc.). By allowing neighboring access points 100 to share radio resources within the overlapping region 16, it is possible to enlarge the overlapping region 16 to provide more time to execute a handover when a mobile device 200 is moving at moderate speeds.

In a first exemplary embodiment, the antennas 14 in the overlapping region 16 of the neighboring coverage areas 12 are connected to corresponding access points 100 in each of the overlapping coverage areas 12. That is, each antenna 14 connects to the access point 100 for each of the neighboring coverage areas 12. In the embodiment shown in FIG. 1, there are only two overlapping coverage areas 12. Thus, each antenna 14 in the overlapping region 16 connects to both AP1 and AP2. However, those skilled in the art will appreciate that some antennas 14 could be located in a region where three or more coverage areas 12 overlap. In this embodiment, the radio resources at each antenna 14 are allocated to respective ones of the access points 100. The radio resources at each antenna 14 may be fully utilized; however, each access point 100 in the neighboring coverage areas 12 will have control of only a portion of the radio resources at each antenna 14.

Any known multiple access scheme may be employed to divide the radio resources between neighboring access points 100. For example, the neighboring access points 100 may be assigned different frequencies to use at each antenna 14. Alternatively, neighboring access points 100 may be assigned different time periods or different codes to use at each antenna 14. Radio resources could also be shared using orthogonal frequency division multiplexing (OFDM). Those skilled in the art will appreciate that other multiplexing techniques also exist and that the enumeration of multiplexing techniques herein is not intended to limit the scope of the claims to the enumerated techniques.

In another exemplary embodiment, each of the transmit antennas 14 in the overlapping region 16 between neighboring coverage areas 12 connect to a selected one of the access points 100. Thus, each access point 100 connects to a subset of antennas 14 in the overlapping region 16 between coverage areas 12. The transmit antennas 14 in the overlapping region 16 are densely packed and intermingled so that each access point 100 may provide coverage throughout the overlapping region 16 with its subset of antennas 14. Again, because multiple access points 100 compete to provide coverage in the overlapping region 16, a multiple access scheme is used to divide the radio resources between the access points 100. In this embodiment, each subset of antennas 14 uses its allocated portion of radio resources in the overlapping region 16. The subsets of antennas 14 combined use all of the radio resources in the overlapping region 16.

The allocation of radio resources at antennas 14 within the overlapping region 16 between two neighboring coverage areas 12 may be preconfigured by the service providers. Any orthogonal multiple access technique may be used, such as TDM, FDM, CDM, and OFDM. The allocation of radio resources does not have to be equal. An access point 100 having greater traffic may be allocated more radio resources than a lightly loaded neighboring access point 100.

The allocation of radio resources within the overlapping region 16 does not have to be fixed. In some embodiments, the allocation of the radio resources in the overlapping region 16 may slowly adapt to changing environment and traffic conditions. Signaling between neighboring access points 100 may be used to reallocate radio resources from one access point 100 to another access point 100 depending, for example, on the load at each access point 100. For example, if AP1 in FIG. 1 is heavily loaded, it may request additional radio resources from AP2. If the radio resources for AP2 are not fully utilized, AP2 may allow AP1 to use those resources for an agreed period of time. For example, AP2 may allow AP1 to use certain frequencies, time slots, or codes for the agreed period of time.

Another way to balance load between neighboring access points 100 is to reassign mobile devices 200 within the overlapping region 16 even though the mobile devices 200 are not in need of handover. This technique applies primarily to mobile devices 200 that are moving slowly and may therefore be served by any one of the neighboring access points 100. As an example, when AP1 is heavily loaded, it may request AP2 to accept handover of a mobile device 200 within the overlapping region 16 in order to reduce its load.

Figure 2:
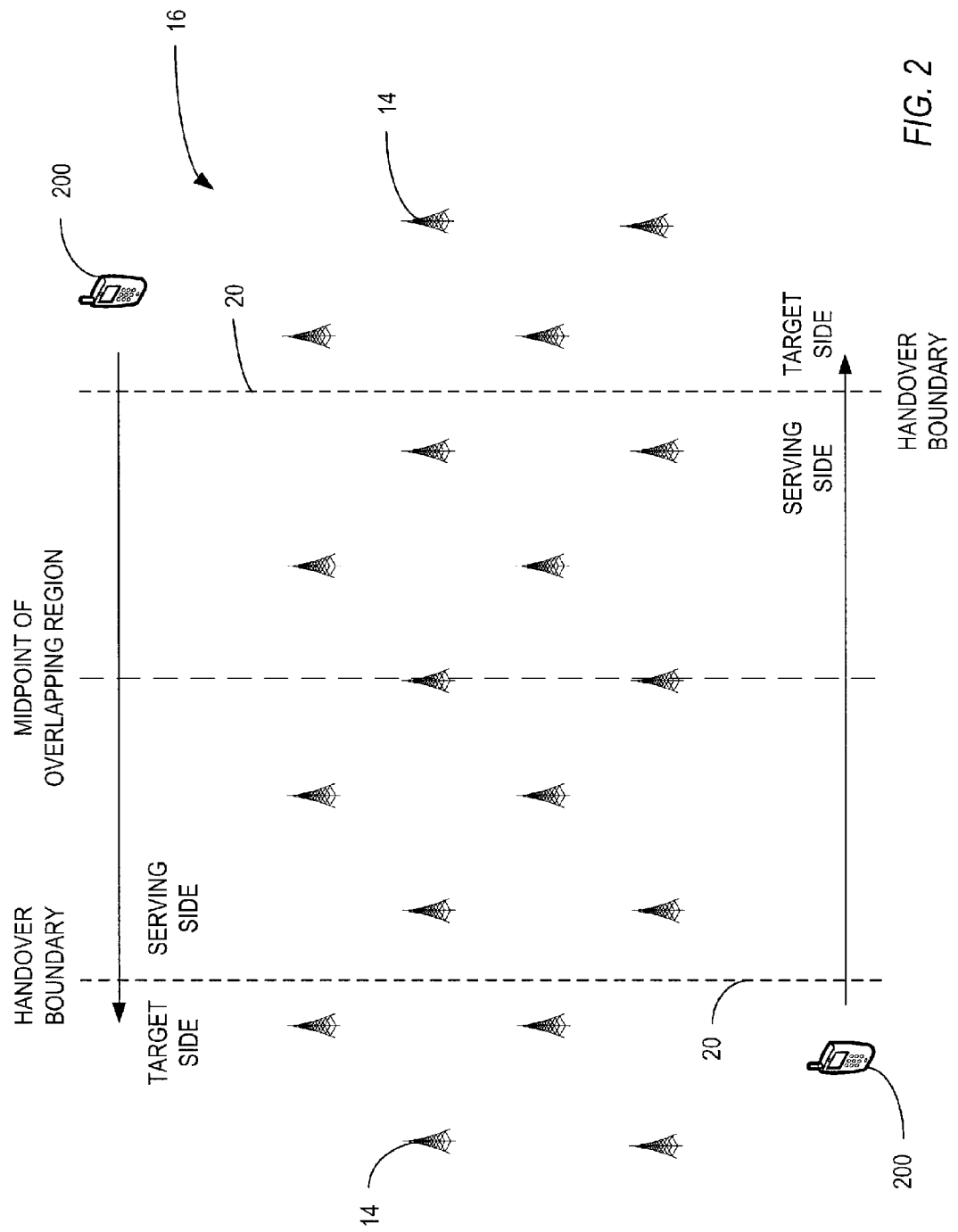
FIG. 2 illustrates a method of handing over a mobile device in a wireless communication network using a distributed antenna system.

As in a conventional cellular system, mobile devices 200 will be in need of handover as the mobile devices 200 move from one coverage area into a different coverage area. Preferably, handover is not initiated until the mobile device 200 reaches a handover boundary 20, which is beyond the midpoint of the overlapping region 16 as shown in FIG. 2. The handover may be triggered by either the mobile device 200 or by a network device, such as the RNC 300. For example, the mobile device 200 may measure the total power received from antennas 14 on both sides of the handover boundary 20. A handover is requested by the mobile device 200 when the received signal power from antennas 14 on the target side of the handover boundary 20 exceeds the received signal power from antennas 14 on the serving side of the handover boundary 20. Alternatively, the network device may measure the total power received from the mobile device 200 by antennas 14 on both sides of the handover boundary 20 and initiate a handover accordingly. The latter approach may be more preferable since the access points 100 will know the location of the handover boundaries 20.

In a preferred embodiment, a first handover boundary 20 is used for mobile devices 200 moving in a first direction, and a second handover boundary 20 is used for mobile devices 200 moving in the opposite direction, as shown in FIG. 2. It will be appreciated that the first and second handover boundaries 20 do not coincide with the boundaries of the overlapping region 16. The first and second handover boundaries 20 are geographically separated to avoid the ping-ponging effect. Thus, when a mobile device 200 moves from a first coverage area towards a second coverage area, handover is determined by a first handover boundary 20. If the mobile device 200 subsequently reverses direction, handover will be determined by a second handover boundary 20. Thus, consecutive handovers will not occur in rapid succession, which could be the case if a single handover boundary 20 was used.

Figure 3:
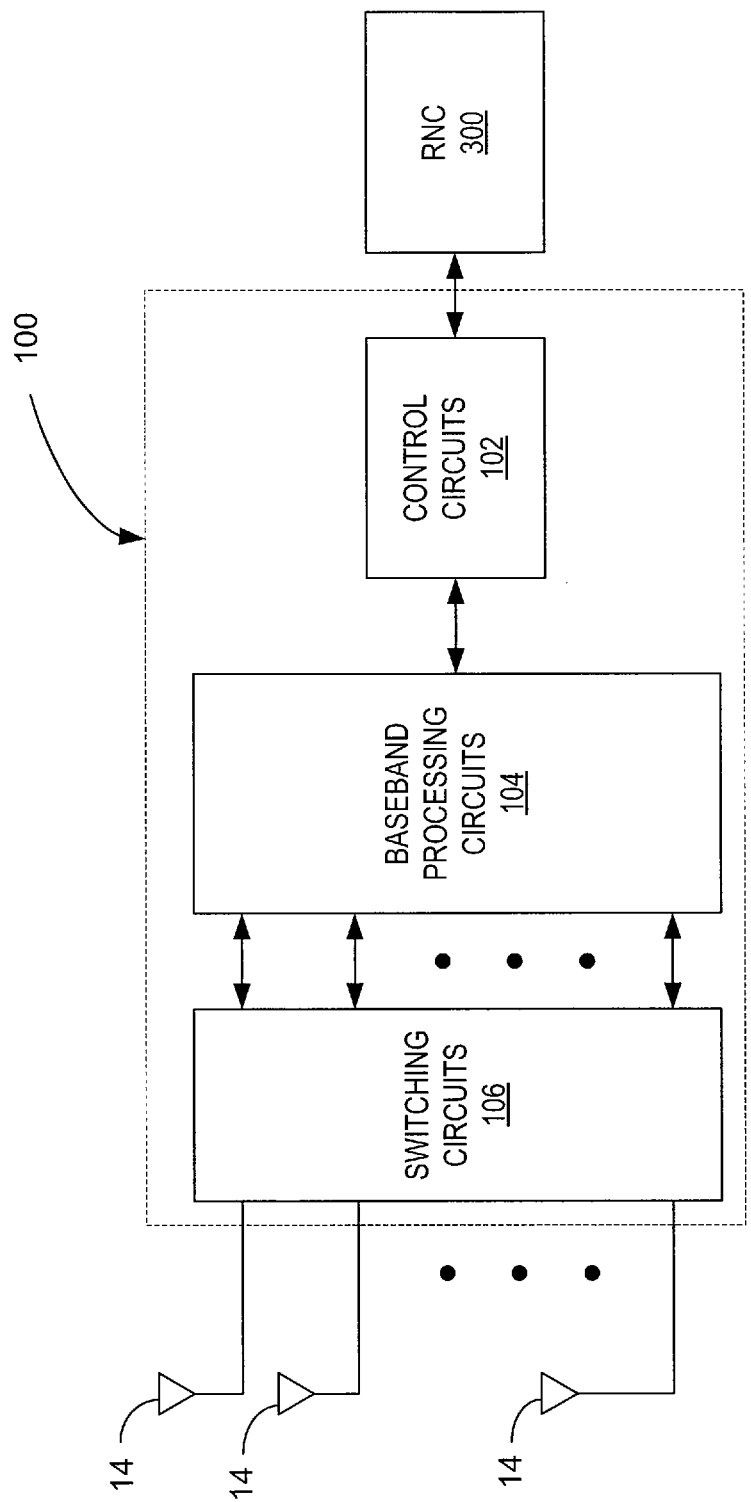
FIG. 3 illustrates an exemplary access point for the wireless communication network of FIG. 1.

FIG. 3 illustrates an exemplary access point 100. Access point 100 comprises a control processor 102, baseband signal processor 104, and switching circuits 106. The control processor 102 controls overall operation of the access point 100 according to any known communication standard. The baseband signal processor 104 processes signals transmitted to and received by the access point 100. Exemplary processing tasks performed by the baseband signal processor 104 comprise modulation/demodulation, coding/decoding, interleaving/de-interleaving, spreading/de-spreading, etc. Switching circuits 106 connect the access point 100 to the antennas 14 within its coverage area.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wireless communication network comprising:
    a plurality of access points providing service to mobile devices over respective coverage areas; and
    within each coverage area, a plurality of antennas distributed within the coverage area and connected to said access point;
    wherein access points in neighboring coverage areas that overlap share, according to a multiple access scheme, radio resources at antennas within an overlapping region of said neighboring coverage areas; and
    wherein a first subset of antennas in the overlapping region are connected to an access point in a first coverage area of said neighboring coverage areas, and wherein a second subset of antennas in the overlapping region are connected to an access point in a second coverage area of said neighboring coverage areas.

2. A method in a wireless communication network, which network comprises a plurality of access points providing service to mobile devices over respective coverage areas, wherein each access point connects to a plurality of antennas distributed over its coverage area, said method comprising:
    overlapping neighboring coverage areas of neighboring access points;
    connecting a first subset of antennas in an overlapping region of said neighboring coverage areas to a first access point in a first neighboring coverage area;
    connecting a second subset of antennas in said overlapping region to a second access point in a second neighboring coverage area; and
    sharing radio resources at the antennas in the overlapping region of said neighboring coverage areas between the access points in said neighboring coverage areas according to a multiple access scheme.

3. The method of claim 2, further comprising connecting one or more of said antennas in said overlapping region of neighboring coverage areas to two or more access points in said neighboring coverage areas.

4. The method of claim 2, further comprising pre-configuring the access points in said neighboring coverage areas to use certain shared radio resources at the antennas within said overlapping region.

5. The method of claim 2 further comprising reallocating shared radio resources at the antennas within said overlapping region between neighboring base stations responsive to changing conditions.

6. The method of claim 5, wherein said access points negotiate directly to reallocate said shared radio resources.

7. The method of claim 2, further comprising:
    setting a first handover boundary in said overlapping region for mobile devices moving from the first neighboring coverage area toward the second neighboring coverage area; and
    setting a second handover boundary in said overlapping region spaced from said first handover boundary for mobile devices moving from said second neighboring coverage area toward said first neighboring coverage area.

8. The method of claim 7, further comprising initiating a handover of a mobile device in said overlapping region based on the strength of received signals from said mobile device at antennas on a target side and a serving side of a handover boundary.

9. The method of claim 7, further comprising said mobile device in said overlapping region initiating a handover based on the strength of received signals at said mobile devices from said antennas on a target side and a serving side of a handover boundary.

10. An access point for a wireless communication network comprising a plurality of access points providing service to mobile devices over respective coverage areas, wherein the access point in each coverage area connects to a plurality of antennas distributed within the coverage area, and wherein neighboring coverage areas of said access point and a neighboring access point overlap, wherein said access point connects to a first subset of antennas in an overlapping region of said neighboring coverage areas, and wherein said neighboring access point connects to a second subset of antennas in said overlapping region, and wherein said access point is configured to share radio resources with said neighboring access point at antennas within the overlapping region of said neighboring coverage areas, according to a multiple access scheme.

11. The access point of claim 10, wherein said access point shares at least one antenna in said overlapping region with the neighboring access point.

12. The access point of claim 10, wherein said access point is pre-configured to use certain shared radio resources at the antennas within said overlapping region.

13. The access point of claim 12, wherein said access point is configured to negotiate directly with the neighboring access point to reallocate the shared radio resources in said overlapping region.

* * * * *